No. 636,476. Patented Nov. 7, 1899.
F. E. WEBSTER.
DENTAL HANDPIECE.
(Application filed Apr. 26, 1899.)
(No Model.)
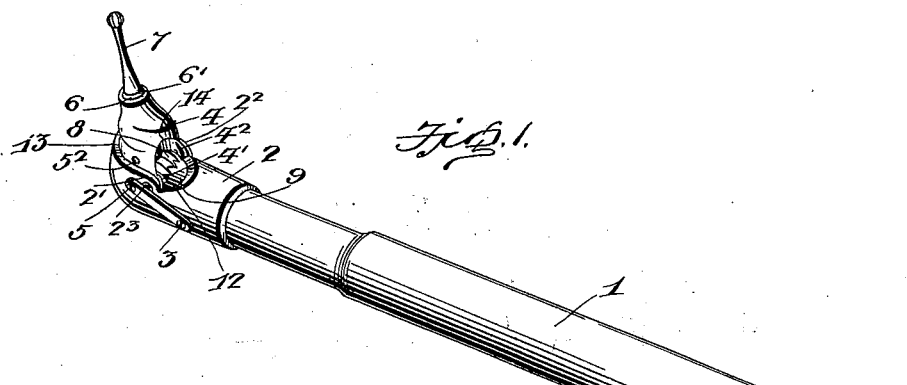
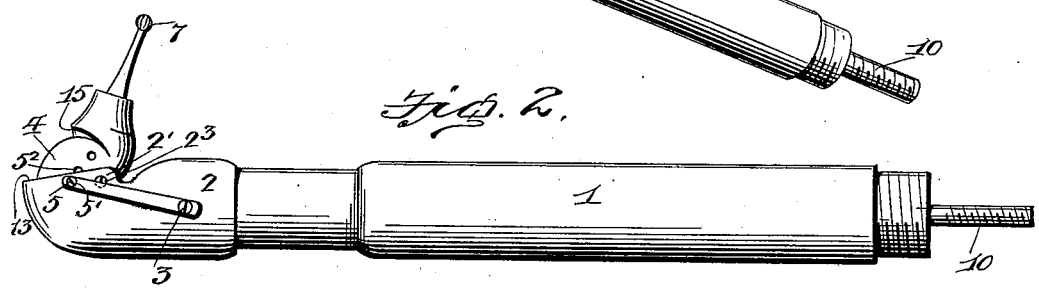
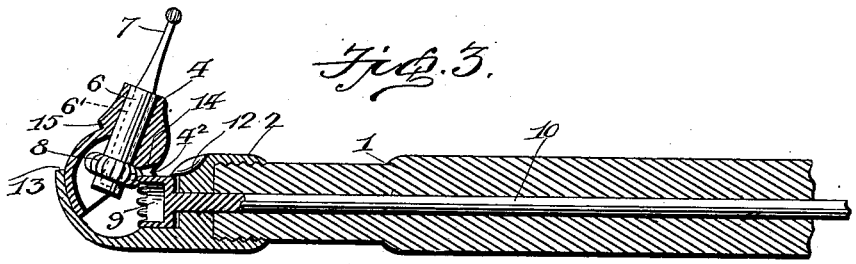
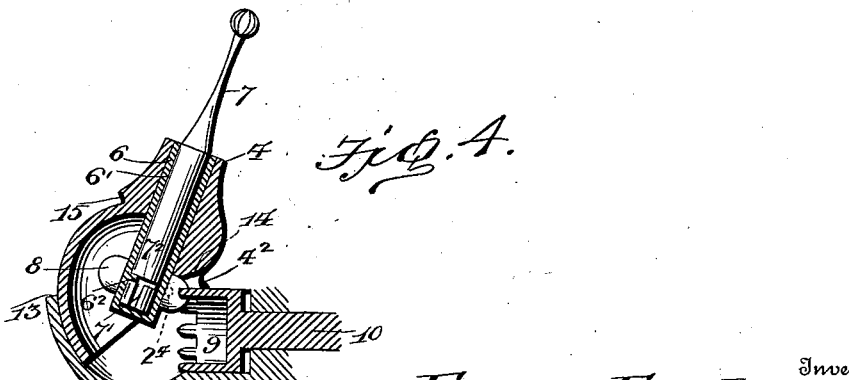
Inventor
Frederick Emory Webster,
by H. B. Willson & Co.
Attorneys
Witnesses

UNITED STATES PATENT OFFICE.

FREDERICK EMORY WEBSTER, OF CLARENDON, ARKANSAS.

DENTAL HANDPIECE.

SPECIFICATION forming part of Letters Patent No. 636,476, dated November 7, 1899.

Application filed April 26, 1899. Serial No. 714,539. (No model.)

*To all whom it may concern:*

Be it known that I, FREDERICK EMORY WEBSTER, a citizen of the United States, residing at Clarendon, in the county of Monroe and State of Arkansas, have invented certain new and useful Improvements in Dental Handpieces; and I do declare the following to be a full, clear, and exact description of the invention, such as will enable others skilled in the art to which it appertains to make and use the same.

My invention relates to improvements in dental handpieces; and the object is to improve and simplify the construction and provide a device of this character that can be conveniently adjusted to any angle and fixed in position when so adjusted.

To these ends the invention consists in the construction, combination, and arrangement of the several parts of the device, as will be hereinafter more fully described, and particularly pointed out in the claims.

In the accompanying drawings the same reference characters indicate the same parts of the invention.

Figure 1 is a perspective view of my improved dental handpiece. Fig. 2 is another view of the same. Fig. 3 is an enlarged detail section of the same, and Fig. 4 is a similar view of the chuck or tool-holder and one of the removable tools.

1 denotes the handpiece, the outer end of which is threaded to receive the hooded sleeve 2, which is adjustably secured thereon by means of the set-screw 3.

4 denotes the chuck or tool-holder, which is formed with the lateral ears $4'$ $4^2$, arranged parallel with the corresponding ears $2'$ $2^2$ on the hood 2 and pivoted therein by the screws $2^3$ $2^4$, so as to have a range of adjustment between the limit-points shown in Figs. 1 and 2, and it is adjusted in these and the intermediate positions by the spring-actuated retaining-pin 5, which extends through the orifice $5'$ in the hood and one of a series of alined orifices $5^2$ in the tool-holder.

6 denotes a sleeve, which rotates freely in the tool-holder, and its longitudinal orifice $6'$ is provided with a radial pin $6^2$, which is adapted to enter a longitudinal groove $7'$ in the shank of the tool 7, the said groove $7'$ communicating with a transverse or tangential groove $7^2$, which receives the pin $6^2$ to lock the tool in the sleeve. The inner end of the sleeve 6 is formed with the spur gear-wheel 8, so as to mesh with the teeth on the crown-gear 9 on the driving-shaft 10, journaled in the handpiece 1. The teeth on the gear-wheel 8 are semicircular in shape and mesh with the teeth on the crown-gear 9 at a point corresponding to an axial line drawn through the pivot-screws $2^3$ and $2^4$, so as to operatively mesh therewith in any position to which the tool-holder and sleeve 6 may be adjusted.

The hooded sleeve 2 is formed with two bearing edges 12 and 13, which form limited abutment for the shouldered flanges 14 and 15, formed on the tool-holder 4, and when the parts are adjusted to the position shown in Fig. 1 the shoulder 15 on the tool-holder abuts against the bearing 13 of the hood and takes the strain from the retaining-pin 5, and when adjusted as shown in Fig. 2 the shoulder 14 abuts against the bearing edge 12 for a like purpose, and in either of these two positions the tool-holder and handpiece are practically as rigid as if made of a single piece.

An important feature of this construction is the fact that the meshing of the gears can be adjusted to a nicety, and wear is also compensated for by means of the manner of adjusting the hooded sleeve on the handpiece.

The accompanying drawings show my invention in the best form now known to me; but many changes in the details might be made within the skill of a good mechanic without departing from the spirit of my invention as set forth in the claims at the end of this specification. It will also be noted that the shank of the bur or tool 7 may be screw-threaded, and by running the engine forward and inserting the tool the pin $6^2$ will engage the threaded shank and hold the tool securely in place, and by reversing the engine the tool is readily detached.

Having thus fully described my invention, what I claim, and desire to secure by Letters Patent, is—

1. In combination, the handpiece, the hooded sleeve adjustably secured thereon, the tool-holder pivoted in said hooded sleeve, the driving-shaft and crown-gear journaled in said handpiece, and the sleeve 6 and spur-gear 8 mounted in said hooded sleeve, substantially as shown and described.

2. In combination, the handpiece, the hooded sleeve formed with the bearing edges 12 and 13, and the tool-holder pivoted in said hooded sleeve, and formed with the shoulders 14 and 15, substantially as shown and described.

In testimony whereof I have hereunto set my hand in presence of two subscribing witnesses.

FREDERICK EMORY WEBSTER.

Witnesses:
J. M. WEST,
H. R. SEIBLY.